(12) United States Patent
Meenan

(10) Patent No.: US 7,769,042 B2
(45) Date of Patent: *Aug. 3, 2010

(54) LOCAL PROTOCOL SERVER

(75) Inventor: Patrick A. Meenan, Chantilly, VA (US)

(73) Assignee: AOL Inc., Dulles, VA (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/532,866

(22) Filed: Sep. 18, 2006

(65) Prior Publication Data

US 2007/0008976 A1 Jan. 11, 2007

Related U.S. Application Data

(63) Continuation of application No. 09/867,546, filed on May 31, 2001, now Pat. No. 7,113,520.

(60) Provisional application No. 60/282,856, filed on Apr. 11, 2001.

(51) Int. Cl.
*H04J 3/16* (2006.01)

(52) U.S. Cl. .................. 370/466; 370/401; 370/465; 370/467

(58) Field of Classification Search .................. None
See application file for complete search history.

(56) References Cited

U.S. PATENT DOCUMENTS

| | | | |
|---|---|---|---|
| 5,425,026 A | 6/1995 | Mori | |
| 5,485,460 A | 1/1996 | Schrier et al. | |
| 5,657,452 A | 8/1997 | Kralowetz et al. | |
| 5,768,525 A | 6/1998 | Kralowetz et al. | |
| 5,905,873 A | 5/1999 | Hartmann et al. | |
| 6,198,751 B1 | 3/2001 | Dorsey et al. | |
| 6,278,697 B1 | 8/2001 | Brody et al. | |
| 6,456,857 B1 | 9/2002 | Bos et al. | |
| 6,463,477 B1 | 10/2002 | Fontenot | |
| 6,487,598 B1 | 11/2002 | Valencia | |
| 6,577,643 B1 | 6/2003 | Rai et al. | |
| 6,591,304 B1 | 7/2003 | Sitaraman et al. | |
| 6,618,393 B1 | 9/2003 | Chiles et al. | |

(Continued)

OTHER PUBLICATIONS

Patent Cooperation Treaty PCT International Search Report, for PCT Application No. PCT/US02/21642, Mar. 12, 2003.

(Continued)

*Primary Examiner*—Michael J Moore, Jr.
(74) *Attorney, Agent, or Firm*—Finnegan, Henderson, Farabow, Garrett & Dunner, LLP

(57) ABSTRACT

Communicating data packets between a client device and a host system generally includes using a protocol server module, located on the client device, that terminates a communication session that uses a first protocol and that is intended to enable communications between a source and a destination, in which the source is one of a client device operating system protocol stack and the host system and the destination is one of the client device operating system protocol stack and the host system but differs from the source. The protocol server module translates data packets from the source between the first protocol and a second protocol that is different from the first protocol and transports the data packets having the second protocol to the destination. A controller module generally also is included on the client device. The protocol server module may include a PPP server module located on the client device.

28 Claims, 11 Drawing Sheets

U.S. PATENT DOCUMENTS

| | | |
|---|---|---|
| 6,757,731 B1 | 6/2004 | Barnes et al. |
| 6,778,541 B2 | 8/2004 | Houston et al. |
| 2002/0085567 A1 | 7/2002 | Ku et al. |

OTHER PUBLICATIONS

Juha Heinanen, "Multiprotocol Encapsulation over ATM Adaptation Layer 5," Jul. 1993, Reguest for Comments: 1483, IETF Network Working Group.

800

810 At the client device, terminate a communication session between the OS protocol stack and the host system 820 Transport the data packets to the client device OS protocol stack

1110 — At the client device, terminate a communication session that uses a first protocol and that is intended to enable communications between a source and a destination 1120 — Translate data packets from the source between the first protocol and a second protocol that differs from the first protocol 1130 — Transport the data packets having the second protocol to the destination

Fig. 11

LOCAL PROTOCOL SERVER

CROSS REFERENCE TO RELATED APPLICATIONS

This application is a continuation of U.S. patent application Ser. No. 09/867,546, filed May 31, 2001, now U.S. Pat. No. 7,113,520 and titled "Local Protocol Server," which claims priority from U.S. Provisional Application No. 60/282,856, filed Apr. 11, 2001, and titled "Local PPP Server For Layer 3." The entire contents of the prior applications are incorporated herein by reference in their entirety.

TECHNICAL FIELD

The invention relates to a PPP server that is located local to a client device and communicates data packets between the client device and a host system.

BACKGROUND

An increasing number of different connectivity types, tunneling mechanisms, and encapsulating protocols may be used to enable communications between a client system and a host system. To enable use of these various methods and protocols, special adapters are generally developed and installed for each different operating system and each encapsulation technology used by a client system. As the number of operating systems are numerous and encapsulation technologies are frequently changing, it becomes increasingly burdensome and inefficient to develop special adapters for each different type of operating system and encapsulation technology in order to take advantage of newly developed connectivity types, tunneling mechanisms, and encapsulating protocols used to communicate with host systems.

SUMMARY

In one general aspect, communicating data packets between a client device and a host system generally includes using a protocol server module, located on the client device, that terminates a communication session that uses a first protocol and that is intended to enable communications between a source and a destination, in which the source is one of a client device operating system protocol stack and the host system and the destination is one of the client device operating system protocol stack and the host system but differs from the source. The protocol server module translates data packets from the source between the first protocol and a second protocol that is different from the first protocol and transports the data packets having the second protocol to the destination. A controller module that is logically connected to the protocol server module and is located on the client device typically controls communications between the client device operating system protocol stack, the protocol server module, and the host system.

Implementations may include one or more of the following features. For example, the data packets may include encapsulation and the protocol server module may translate the data packets by removing the encapsulation from the data packets. Additionally or alternatively, the protocol server module may translate the data packets by encapsulating the data packets using any one of several communication protocols that differs from the original protocol.

The client device operating system protocol stack may support PPP. The protocol server module may include a PPP server module located on the client device. The PPP server module may terminate a PPP communication session between the client device operating system protocol stack and the host system. The PPP server module may negotiate a PPP communication session with the client device operating system protocol stack.

The protocol server module and the controller module may perform transparently to a sender of the data packets. The protocol server module may enable collection of data for error checking. The protocol server module may filter the data packets prior to transporting the data packets to the destination. A virtual modem adapter logically connected between the client device operating system protocol stack and the protocol server module also may be included. The data packets may include layer three data packets.

In another general aspect, communicating data packets between a client device and a host system generally includes using a protocol server module, located on the client device, that terminates a communication session between a source and a destination, in which the source is one of a client device operating system protocol stack and the host system and the destination is one of the client device operating system protocol stack and the host system but differs from the source. The protocol server module transports the data packets to the destination through a network using any one of several communication protocols. A controller module that is logically connected to the protocol server module and is located on the client device typically controls communications between the client device operating system protocol stack, the protocol server module, and the host system.

Implementations may include one or more of the following features. For example, the protocol server module may translate the data packets prior to transporting the data packets. The data packets may include encapsulation and the protocol server module may translate the data packets by removing the encapsulation from the data packets. Additionally or alternatively, the protocol server module may translate the data packets by encapsulating the data packets using any one of several communication protocols that differs from the original protocol.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

FIG. 8 is a flow chart of a process for communicating data packets from a host system to a client device over a communication path established using a protocol server module.

FIG. 11 is a flow chart of a process for communicating data packets between a client device and a host system.

Like reference symbols in the various drawings indicate like elements.

DETAILED DESCRIPTION

Figure 1:
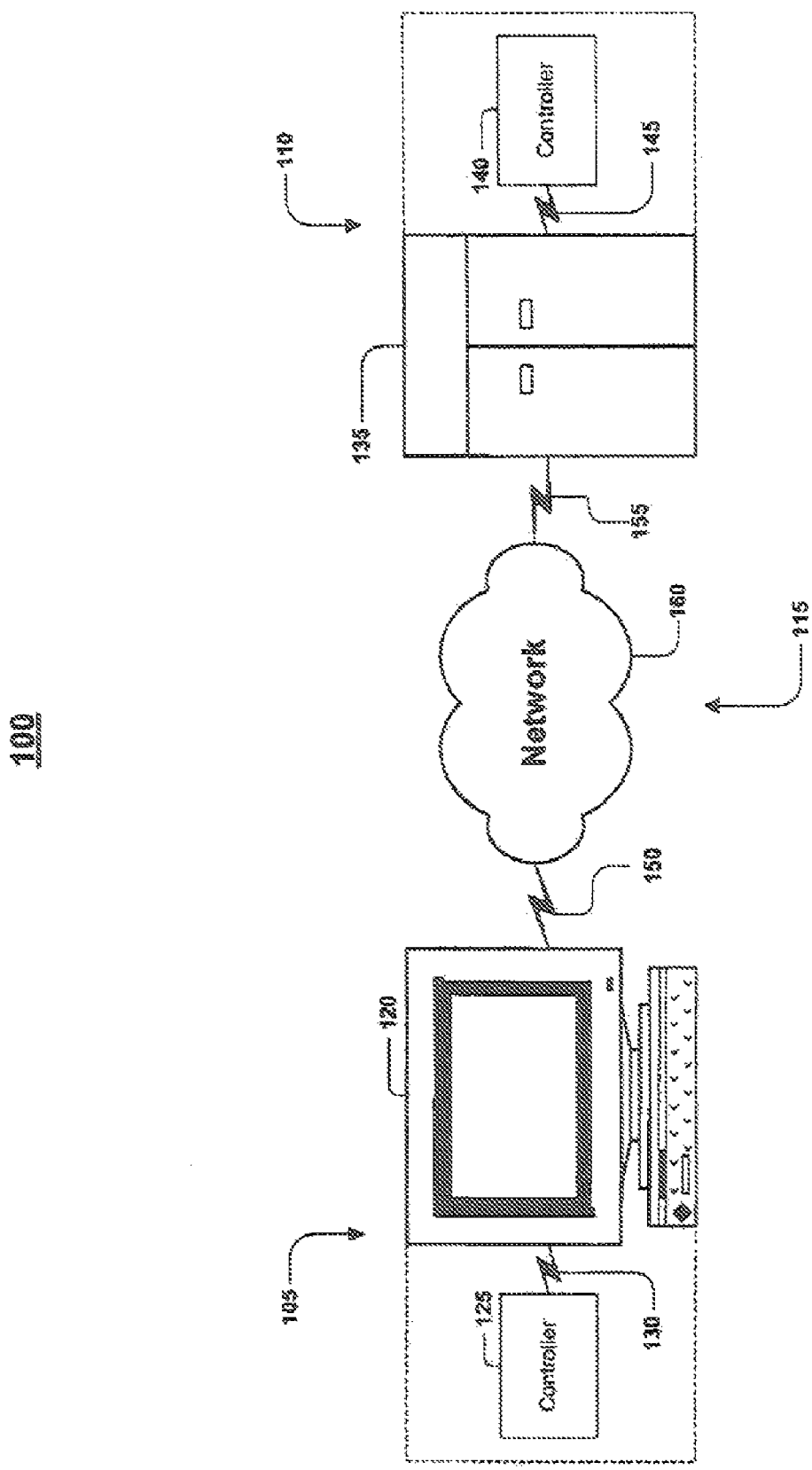
FIG. 1 is a block diagram of a communications system.
Figure 2:
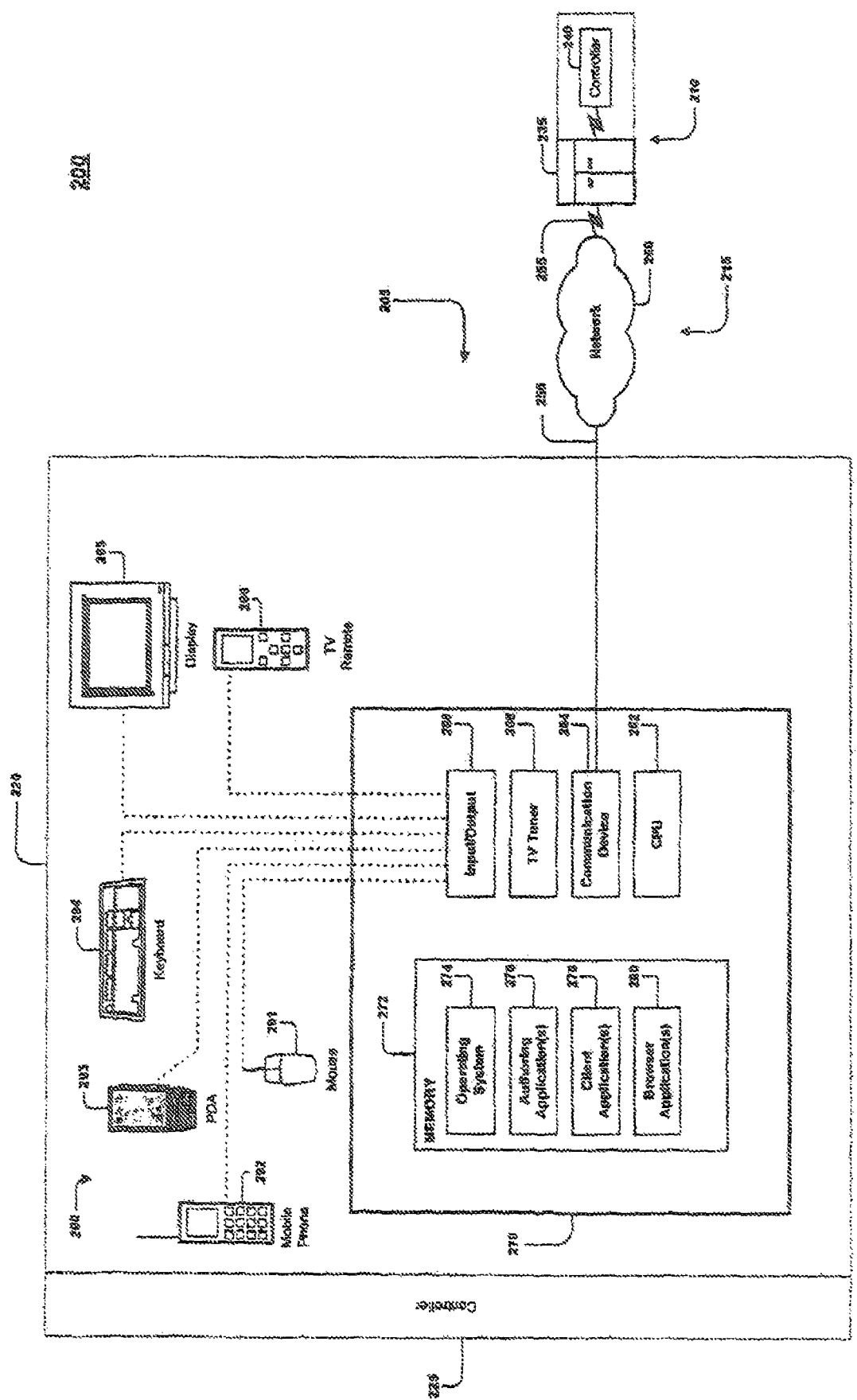
FIGS. 2 and 3 are expansions of the block diagram of FIG. 1.
Figure 3:
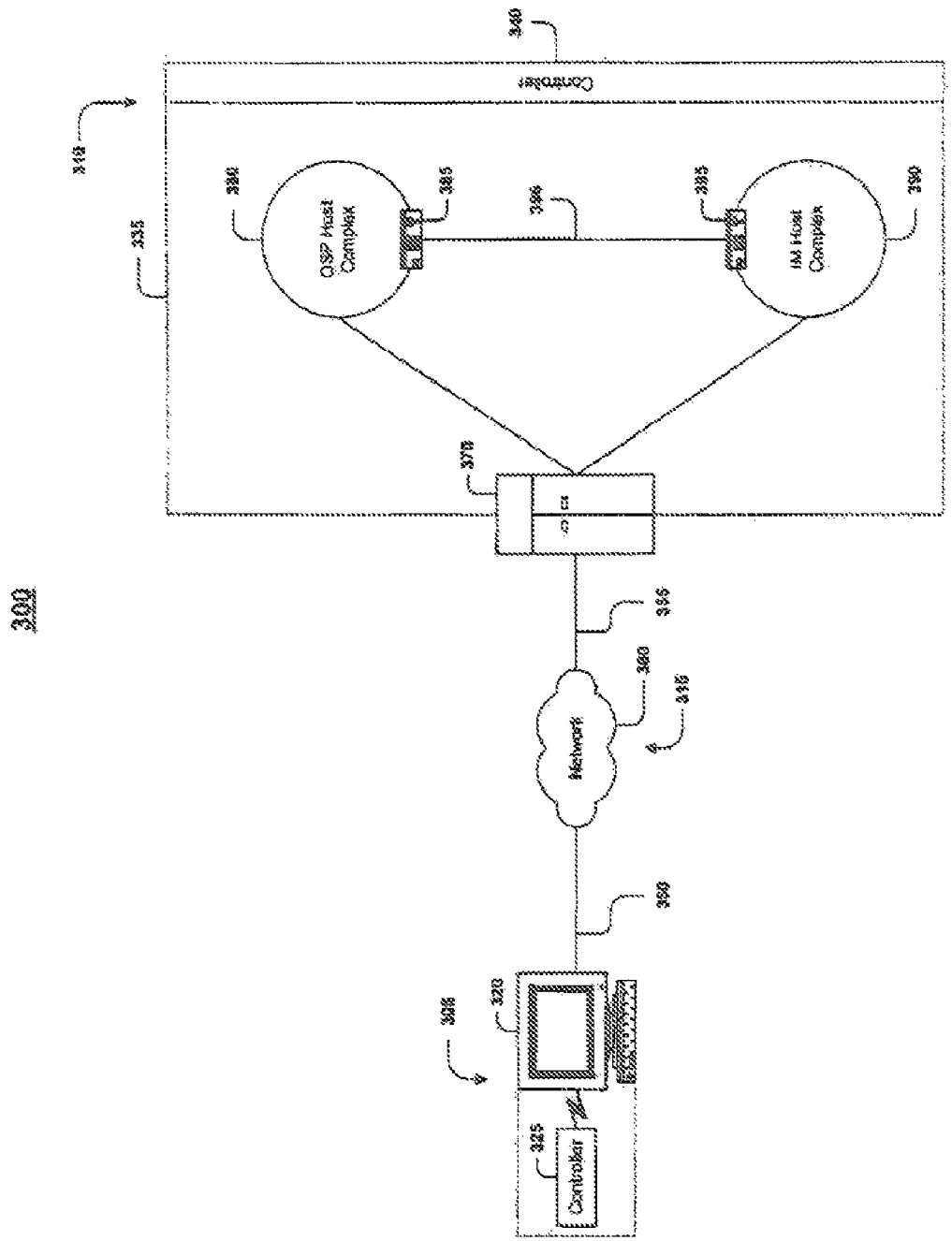

For illustrative purposes, FIGS. 1-3 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller 135) is generally capable of executing instructions under the command of a client controller 125 (or a host controller 140). The client device 120 (or the host device 135) is connected to the client controller 125 (or the host controller 140) by a wired or wireless data pathway 130 (or pathway 145) capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 capable of enabling direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery or tunneling mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system 200 of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attribute comparable to and may illustrate one possible implementation of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, Windows ME™, Windows XP™, OS/2, Mac OS X, Unix, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering content such as standard Internet content and email content. Other examples of application programs may include, for example, a PPP client, and UDP client, a PPPoE client, and a L2TP client, which may be included as a client application 278 or may be a separate application program used to support other application programs, such as the client applications 278 and the browser applications 280.

The general-purpose computer 270 also includes a central processing unit 282 (CPU) for executing instructions in response to commands from the client controller 225. In one implementation, the CPU 282 executes instructions included in one or more of the application programs installed on the internal or external storage 272 of the general-purpose computer 270. In another implementation, the CPU 282 executes instructions included in application programs externally stored in and executed by one or more devices(s) external to the general-purpose computer 270.

The general-purpose computer 270 typically will include a communication device 284 for sending and receiving data. One example of the communication device 284 is a modem, such as a DSL modem, a cable modem, or a satellite modem. Other examples include, a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving TV programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connecting to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices (not shown).

Although FIG. 2 illustrates devices, such as a mobile telephone 292, a PDA 293, and a TV remote control 296, as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some or all of the components and devices described above.

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and may illustrate one possible implementation of the host systems 110 and 210 shown in FIGS. 1 and 2.

The host system 310 includes a host device 335 and a host controller 340. The host controller 340 generally is capable of transmitting instructions to any of all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

In the implementation shown by FIG. 3, the host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, such as, for example, an OSP client application and an IM client application. The OSP and IM client applications are designed to facilitate the subscriber's interactions with the respective services and, in particular, may provide access to the services available within the respective host complexes. For example, in an Instant Messaging application, a subscriber may use the IM client application to determine whether particular subscribers ("buddies") are online, to exchange instant messages with particular subscribers, to participate in group chat rooms, to send and receive files such as pictures, invitations or documents, to find other subscribers with similar interests, to receive or perceive customized news and stock quotes, and to search the Web.

Typically, the OSP host complex 380 supports services such as email, discussion groups, chat, news services, and Internet access. The OSP host complex 380 is generally designed with an architecture that enables the machines within the OSP host complex 380 to communicate with each other, where certain protocols (i.e., standards, formats, conventions, rules, and structures) are employed to enable to transfer of data. The OSP host complex 380 ordinarily employs one or more OSP protocols and custom dialing engines to enable access by selected client applications. The OSP host complex 380 may define one or more specific ptorocols for each service based on a common, underlying proprietary protocol.

The IM host complex 390 generally is independent of the OSP host complex 380, and supports IM services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the IM services. The IM host complex 390 has an architecture that enables the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway 396. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
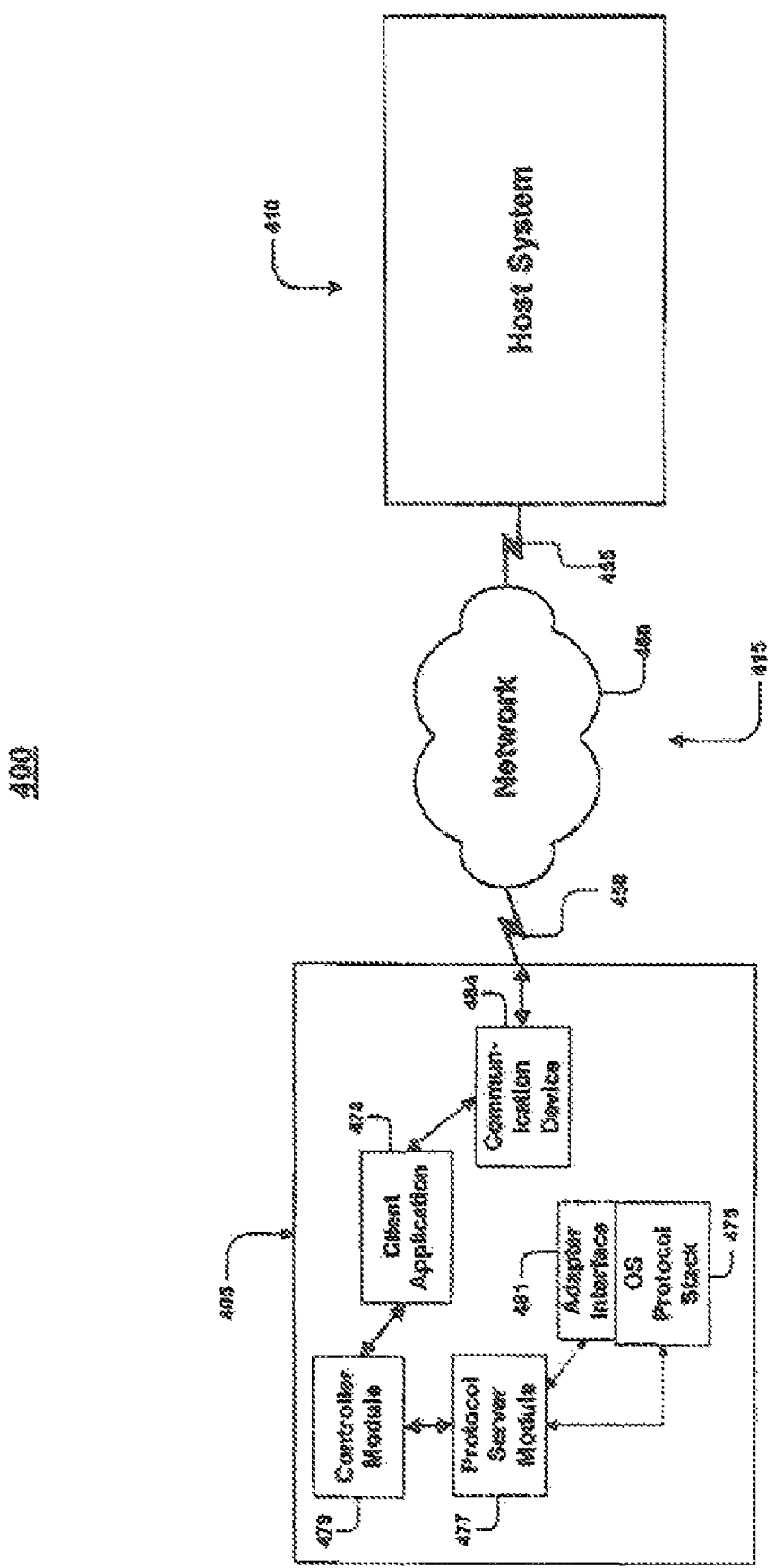
FIG. 4 is an expansion of the block diagram of FIG. 1 including a local protocol module.

FIG. 4 shows an implementation of a communications system 400 that includes a client system 405, a host system 410, a communications link 415. The communications link 415 may include communication pathways 450, 455 enabling communications through the one or more delivery networks 460.

Examples of each element within the communications system 400 of FIG. 4 are broadly described above with respect to FIGS. 1-3. In particular, the host system 410 and the communications link 415 typically have attributes comparable to those described with respect to host systems 110, 210, and 310 and communications links 115, 215, and 315 shown in FIGS. 1-3. Likewise, the client system 405 of FIG. 4 may have attributes comparable to and may illustrate one possible implementation of the client systems 105, 205, and 305 shown in FIGS. 1-3, and the communication pathways 450, 455 and delivery networks 460 typically have attributes comparable to and may describe one possible implementation of the communication pathways 150, 155, 250, 255, 350, and 355, and delivery networks 160, 260, and 360 shown in FIGS. 1-3.

The client system 405 may include an operating system (OS) protocol stack 475, a protocol server module 477, a client application, 478, a controller module 479, and a communication device 484. The OS protocol stack 475 may be included as part of an operating system such as, for example, the operating system 274 described above in FIG. 2. The OS protocol stack 475 may be designed for or capable of enabling the operating system to encapsulate data for communication. In general, the OS protocol stack 475 is implemented using a PPP interface in operating systems such as the operating system 274 described above with respect to FIG. 2. For example, Windows™ operating systems generally include an NDISWAN component that functions as the PPP interface. Yet in some Windows™ operating systems and in some other types of operating systems, a PPP Daemon (PPPD) may function as the PPP interface.

The protocol server module 477 typically is structured and arranged to interface with the client device operating system protocol stack 475 and to configure and transport data packets between the OS protocol stack 475 and the host system 410 through delivery network 460. The protocol server module 477 enables the client system 405 and the host system 410 to communicate through the delivery network 460 using any one of several encapsulating protocols.

The protocol server module 477 may terminate a communication session with the OS protocol stack 475 using a first protocol. For example, the OS protocol stack 475 may start a communication session intending to negotiate and exchange configuration data from the host system 410 using the first protocol. Instead, the protocol server module 477 "spoofs" the OS protocol stack 475 and negotiates and terminates the communication session, rather than the host system 410. The "spoofing" typically is transparent to the OS protocol stack 475 and the host system 410. By terminating the communication session at the protocol server module 477, the protocol server module 477 may negotiate a separate communication session with the host system 410 using a second protocol that is different from the first protocol. The host system 410 may transmit configuration and/or other data to the protocol server module 477 using the second protocol, in which the configuration and/or other data is destined for the OS protocol stack 475. The protocol server module 477 may transport this data to the OS protocol stack 475.

Data packets that destined to be communicated between the OS protocol stack 475 and the host system 477 are translated by the protocol server module 477 between the first protocol and the second protocol. For example, when the data packets include encapusaltion, the protocol server module 477 may translate the data packets by removing the encapsulation from the data packets. Additionally or alternatively, the protocol server module 477 may translate the data packets by encapsulating the data packets using any one of several communication protocols.

The protocol server module 477 may be implemented as a client application or as a software module within a client application (e.g., client application 278 of FIG. 2). The encapsulation may be performed by the protocol server module 477 or alternatively may be performed by a separate client application 478 (e.g., PPP client, UDP client, PPPoE client, L2TP client, or AOL client).

The controller module 479 may be logically connected to the protocol server module 477 and may be structured and arranged to control communications between the OS protocol stack 475, the protocol server module 477, and the host system 410. The controller module 479 may be implemented as a client application or as a software module within a client application (e.g., client application 278 of FIG. 2). Additionally, the controller module 479 also may function to control the communication device 484.

The communication device 484 typically has the attributes of and includes one or more of the communication devices described above with respect to communication device 284 of FIG. 2.

The protocol server module 477 may interface directly with the OS protocol stack 475 or the client system 405 may further include an adapter 481 for the protocol server module 477 to interface with the OS protocol stack 475. For instance, in some operating systems in which the OS protocol stack 475 is implemented using a PPPD, the protocol server module 477 may interface directly with the PPPD without the need for an adapter 481. By contrast, in other operating systems, such as Windows™ operating systems, in which the OS protocol stack 475 is implemented using NDISWAN, the adapter 481 may be used to interface the protocol server module 477 and the NDISWAN protocol stack. More specifically, for example, a WAN Miniport adapter 481 may be used as a virtual modem to interface the protocol server module 477 and the NDISWAN.

In one implementation, the protocol server module 477 may include a PPP server module. When the protocol server module 477 functions as a PPP server module, it may terminate a PPP communication session between the OS protocol stack 475 and the host system 410. The PPP server module also negotiates a PPP communication session with the OS protocol stack 475. The PPP server module may translate PPP data packets from the OS protocol stack 475 destined for the host system 410. For example, the protocol server module 477 may translate the data packets by removing the PPP encapsulation. The data packets may include data packets in a format consistent with, for example, Internet protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP, and L2TP). Alternatively, the encapsulation may be performed by a client application 478. Additionally, the protocol server module 477 may translate data packets from the host system 410 by removing the encapsulation from the data packets, encapsulating the packets in PPP, and transport the packets to the client device OS protocol stack 475.

Additionally or alternatively, the protocol server module 477 may function to filter packets of data prior to transporting the packets to the host system 410. For instance, the protocol server module 477 may remove and discard any unnecessary data packets to reduce the communication bandwidth usage and/or to allow more communication bandwidth for the necessary data.

The protocol server module 477 enables the client system 405 to communicate with the host system 410 using various encapsulating protocols that are supported by the delivery network 460 and the host system 410. For instance, although a client system 405 may support only a PPP encapsulating protocol through its OS protocol stack 475, the protocol server module 477 may function to enable the client system 405 to communicate through the delivery network 460 with the host system 410 using other encapsulating protocols. In a more specific example, the protocol server module 477 generally enables the client system having only a PPP protocol interface to communicate with the host system 410 using, for example, Layer Two Tunneling Protocol (L2TP), PPP over Ethernet (PPPoE), User Datagram Protocol (UDP) tunneling, token tunneling (e.g., a P3 tunnel), any other encapsulating protocols and tunneling mechanisms, or a combination of these encapsulating protocols and tunneling mechanisms.

Figure 5:
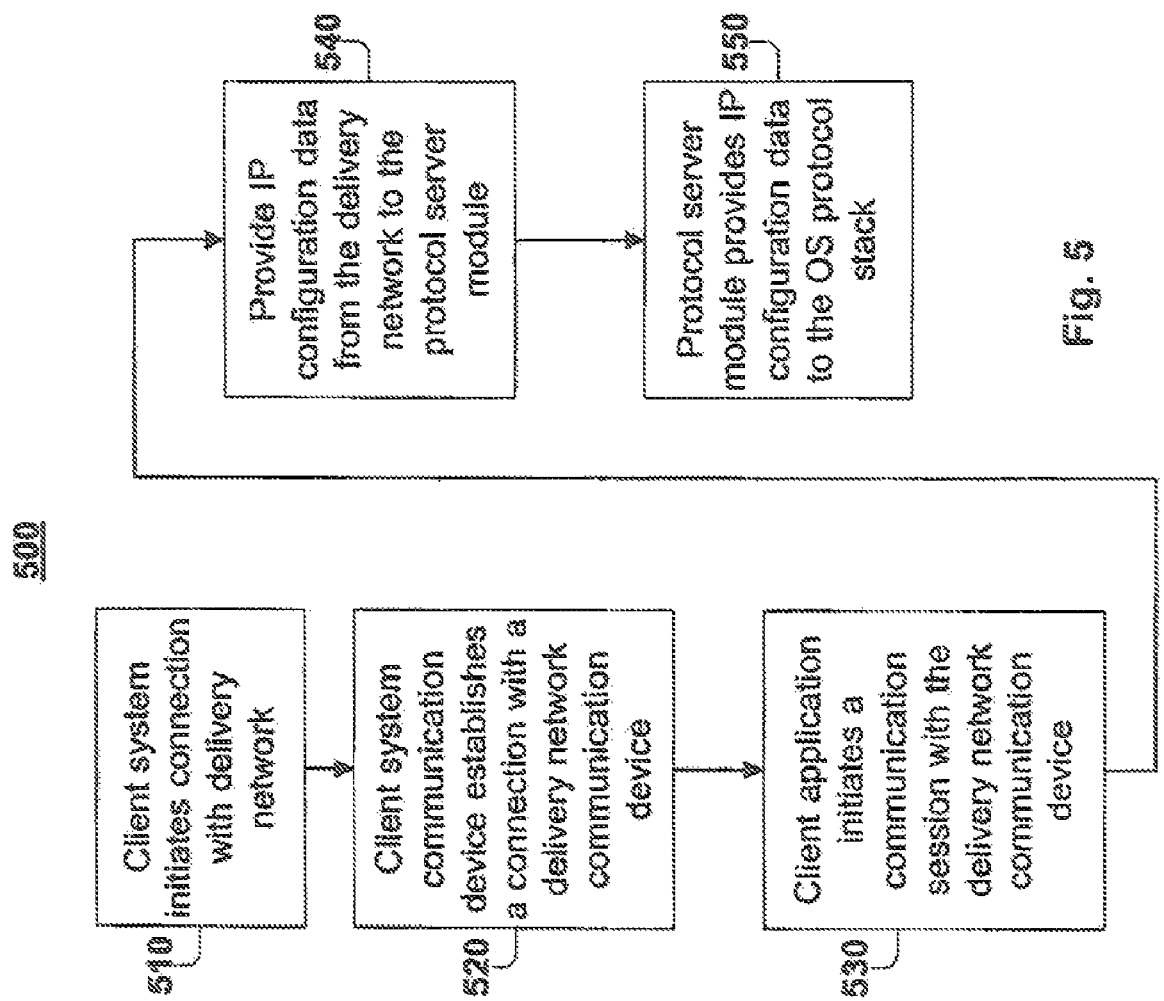
FIG. 5 is a flow chart of a process for establishing a connection between a client system and a host system through a delivery network using a protocol server module.

FIG. 5 illustrates a process 500 for establishing a connection between a client system and a host system through a delivery network. In process 500, the client system typically initiates a connection with the delivery network (step 510). A connection generally is established between the client system communication device and a delivery network communication device (e.g., a terminal server) (step 520). A communication session between a client application (e.g., client application 478) and the delivery network communication device may be initiated (step 530). The delivery network typically provides configuration data (e.g., IP configuration data) to the protocol server module (step 540), and the protocol server module generally provides the configuration data to the client device operating system protocol stack (step 550).

For instance, with reference to FIG. 4, initiating a connection with the delivery network 460 (step 510) may include the client system 405 launching a client application 478 and requesting a connection to a host system 410. More specifically, an application executed by client 405 may signal controller module 479 to instruct the client system communication device 484 to connect to a communication device of host system 410 through the delivery network 460. In other implementations, a connection may already be established between the client system 405 and another device through the delivery network 460, such as, for example, when the client system communication device 484 includes a cable modem, a DSL modem, or a satellite modem. In the instance where the connection to the delivery network 460 is already established, the client system 405 still may launch a client application 478 and request a connection to a host system 410 using the established connection through the delivery network 460.

A connection may be established between a client system communication device 484 and a delivery network communication device (step 520). In other implementations, the connection already may be established between the client system communication device 484 and the delivery network communication device. After the connection is established with the delivery network communication device, a communication session is started between the client system client application 478 and the delivery network communication device (step 530). The client system client application 478 may include, for example, a PPP client, a PPPoE client, an L2TP client, a UDP client, or a proprietary client. During this communication session, the client system client application 478 discovers configuration data needed by the client system 405 to communicate with the host system 410. The configuration data may include IP configuration data, such as address information (e.g., host-assigned IP address information) and domain name server (DNS) information.

The client system client application 478 then provides the IP configuration data received from the delivery network 460 to the protocol server module 477 (step 540). The protocol server module 477 uses the IP configuration data to communicate information with the client device OS protocol stack 475 (step 550). The client system 405 may complete the connection with the host system 410 by providing identification and/or authentication information, such as a screen name and/or a password.

By the client system using a host-assigned IP address to communicate with the host system, the host system is able to enforce host-based controls, such as parental controls. Using the host-assigned IP address also enables the client system access to host-maintained user specific information, such as, for example, wallet information, personal finance information, personal web page information, and other personal information. The host-assigned IP address may be used in combination with other identifying and authentication information for the client system, such as a screen name and/or a password, to enforce controls and to allow access to personal or secured information.

In one example implementation, the client system may include a Windows™ operating system and a WAN Miniport adapter, as shown by FIG. 4 at reference numeral 481, which may function as a virtual modem. In this instance, referring to FIG. 6, the protocol server module provides the IP configuration data to the OS protocol stack (step 550) by placing a Telephony Application Program Interface (TAPI) call to the OS protocol stack using the WAN Miniport adapter, where a process ID may be used as the phone number (step 610). In response to this call, the WAN Miniport adapter may open a connection line with which it associates the given process ID (step 620), and may place a Remote Access (RAS) call over that connection line (step 630). The WAN miniport adapter may associate the open RAS connection line with the TAPI line using the same process ID (step 640). The OS protocol stack uses NDISWAN to begin PPP negotiation through the RAS connection with the WAN Miniport adapter (step 650). The WAN Miniport adapter forwards PPP traffic between the RAS line and the TAPI line to the protocol server module (step 660). Using the conduit provided through the WAN Miniport adapter, the protocol server module then provides the OS protocol stack enabled NDISWAN with the IP configuration data (step 670) received from the delivery network in step 540.

Once a connection is established as described above with respect to FIGS. 5 and 6, the established connection may be used to enable communication between the client system 405 and the host system 410 as described below with respect to FIGS. 7-10.

Figure 6:
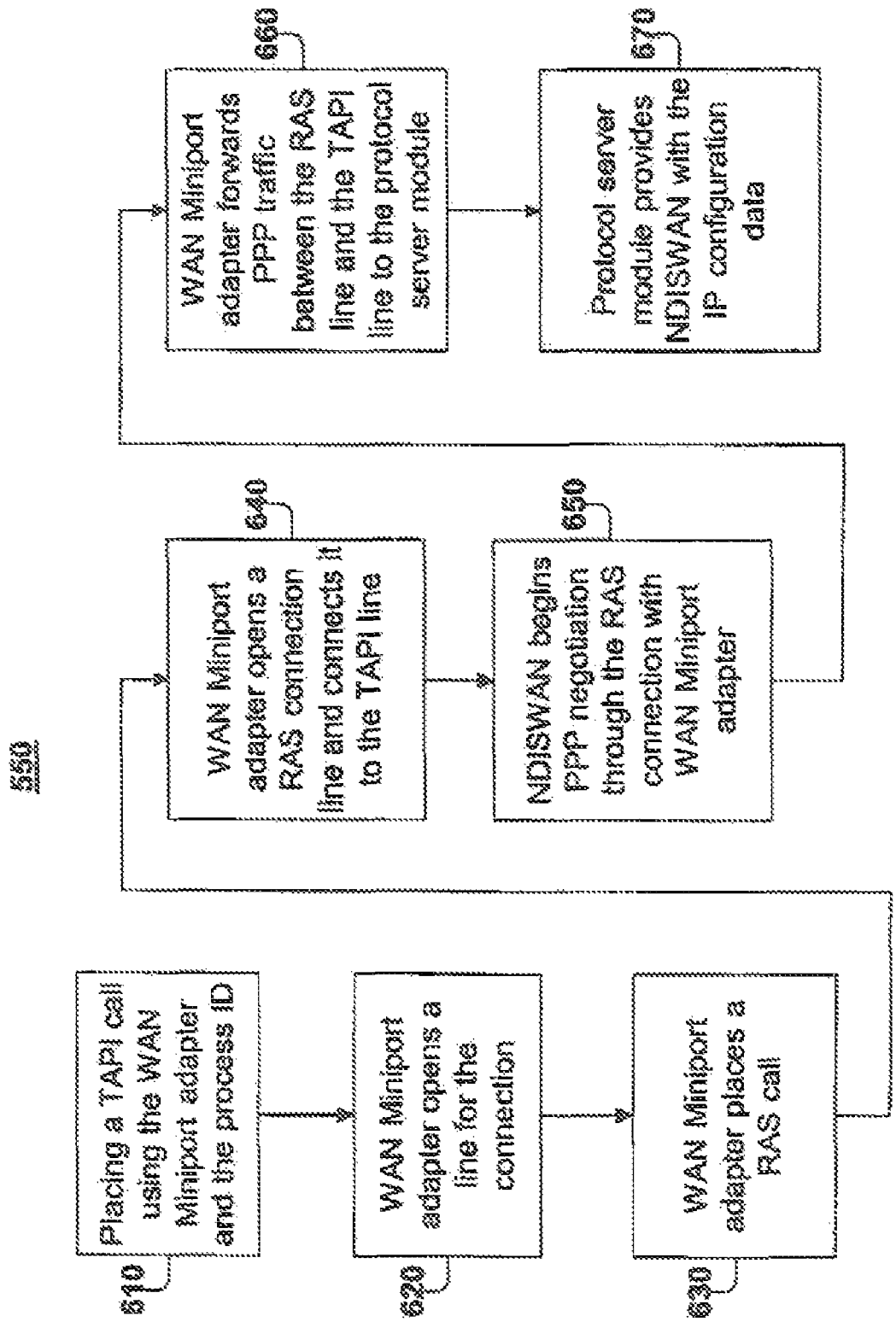
FIG. 6 is an expansion of the process of FIG. 5 is an example implementation involving the use of a WAN Miniport Adapter.
Figure 7:
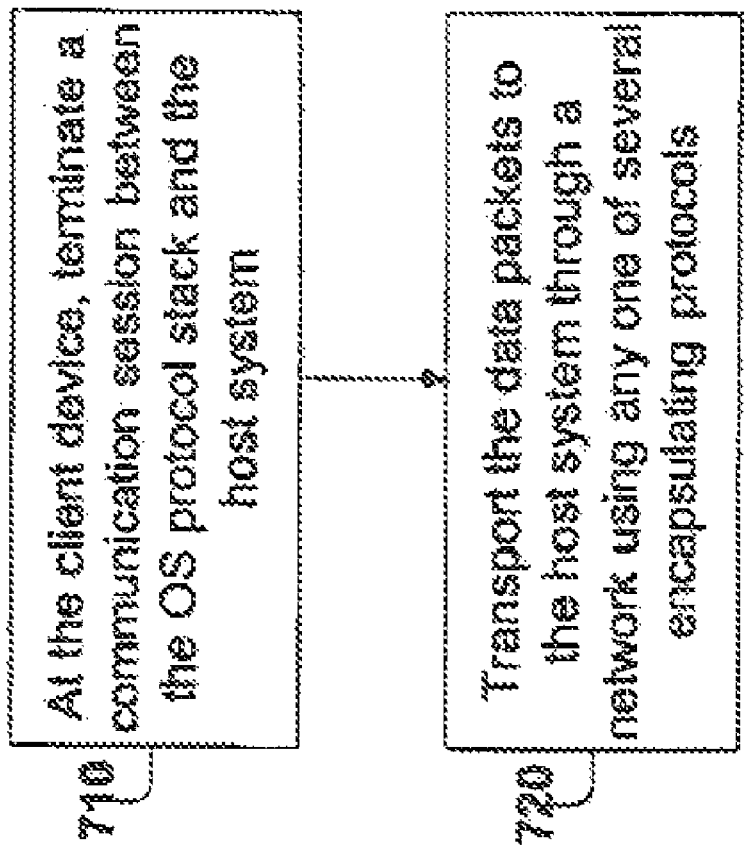
FIG. 7 is a flow chart of a process for communicating data packets from a client device to a host system over a communication path established using a protocol server module.

With reference to FIG. 7, a communication path established as described in FIGS. 5 and 6 (or otherwise) using a protocol server module may be used to communicate data packets (e.g., layer three data packets) from a client device to a host system using any of several communication protocols. Process 700 of FIG. 7 typically includes using a protocol server module located on the client device to terminate a communication session between the OS protocol stack and the host system (step 710). The protocol server module then transports the packets of data to the host system through a delivery network, where the packets of data are encapsulated using any one of several communication protocols (step 720). The communication protocols include any of the encapsulating protocols discussed above with respect to FIG. 4. Process 700 further may include translating the data packets prior to transporting the data packets. For example, translating the data packets may include removing an encapsulation from the data packets and/or re-encapsulating the data packets in a different encapsulation for transport to the host system. The re-encapsulation may be performed by the protocol server module or may be performed by another component, such as a client application.

In one implementation, the protocol server module may include a PPP server module and the client device OS protocol stack may support PPP. For instance, the PPP server module may terminate a PPP communication session between the OS protocol stack and the host system. The PPP server may negotiate a PPP communication session with the OS protocol stack.

With reference to FIG. 8, a communication path established as described in FIGS. 5 and 6 (or otherwise) using a protocol server module may be used to communicate data packets (e.g., layer three data packets) from a host system to a client device using any one of several communication protocols. Process 800 of FIG. 8 typically includes using a protocol server module located on the client device to terminate a communication session between the OS protocol stack and the host system (step 810). The protocol server module transports the data packets from the host system to the client device operating system protocol stack (step 830). Process 800 further may include translating the data packets prior to transporting the data packets, as described above with respect to process 700 of FIG. 7. For example, the protocol server module typically encapsulates the data packets in an encapsulating protocol recognizable by the client device OS protocol stack.

In one implementation, the protocol server module may include a PPP server module and the client device OS protocol stack may support PPP. In this implementation, the PPP server module receives the data packets from the host system, translates the data packets by removing any encapsulation applied by the host system and re-encapsulating the packets in PPP. The protocol server module transports the packets to the OS protocol stack (step 830).

Figure 9:
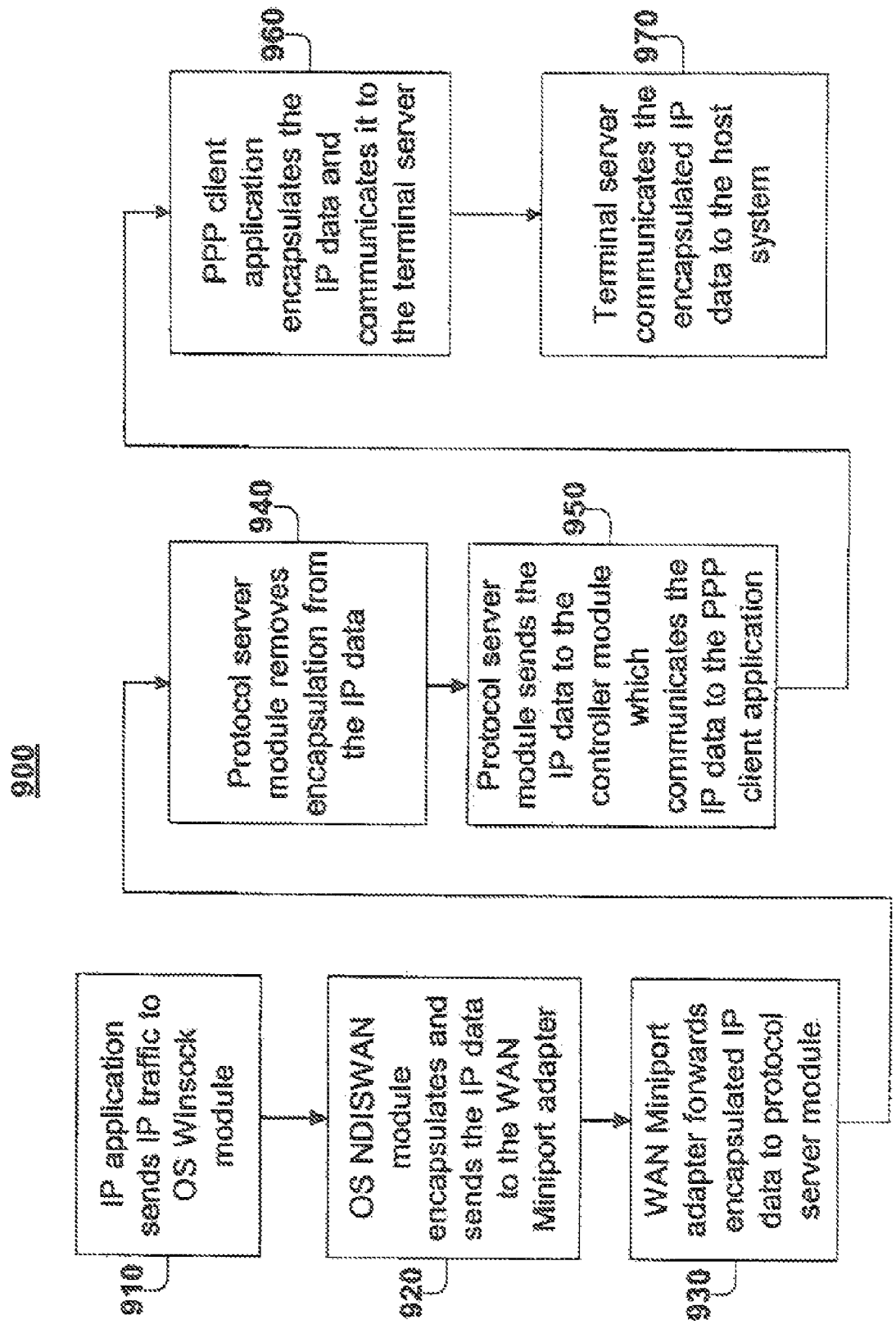
FIG. 9 is a flow chart of a process of an example implementation of the process of FIG. 7.

Referring to FIG. 9, in an implementation in which the client system includes a Windows™ operating system, a PPP client application, a modem, and the delivery network includes an L2TP dial-up network having and a terminal server, process 900 illustrates that the client system may send IP data to the host system through the delivery network by using an IP application to send IP data to the operating system Winsock module (step 910). The operating system NDISWAN module encapsulates the IP data using PPP and sends the encapsulated IP data to the WAN Miniport adapter (step 920), which includes a virtual modem. The WAN Miniport adapter forwards the encapsulated IP data to the protocol server module (step 930), which, in this instance, includes a PPP server module. The protocol server module removes the encapsulation from the IP data and may filter the IP data (step 940). The protocol server module then sends the IP data to the controller module, which communicates the IP data to the PPP client application (step 950). The PPP client application encapsulates the IP data in PPP and communicates the encapsulated IP data through the delivery network to the terminal server (step 960), which then communicates the encapsulated IP data to the host system (step 970).

Figure 10:
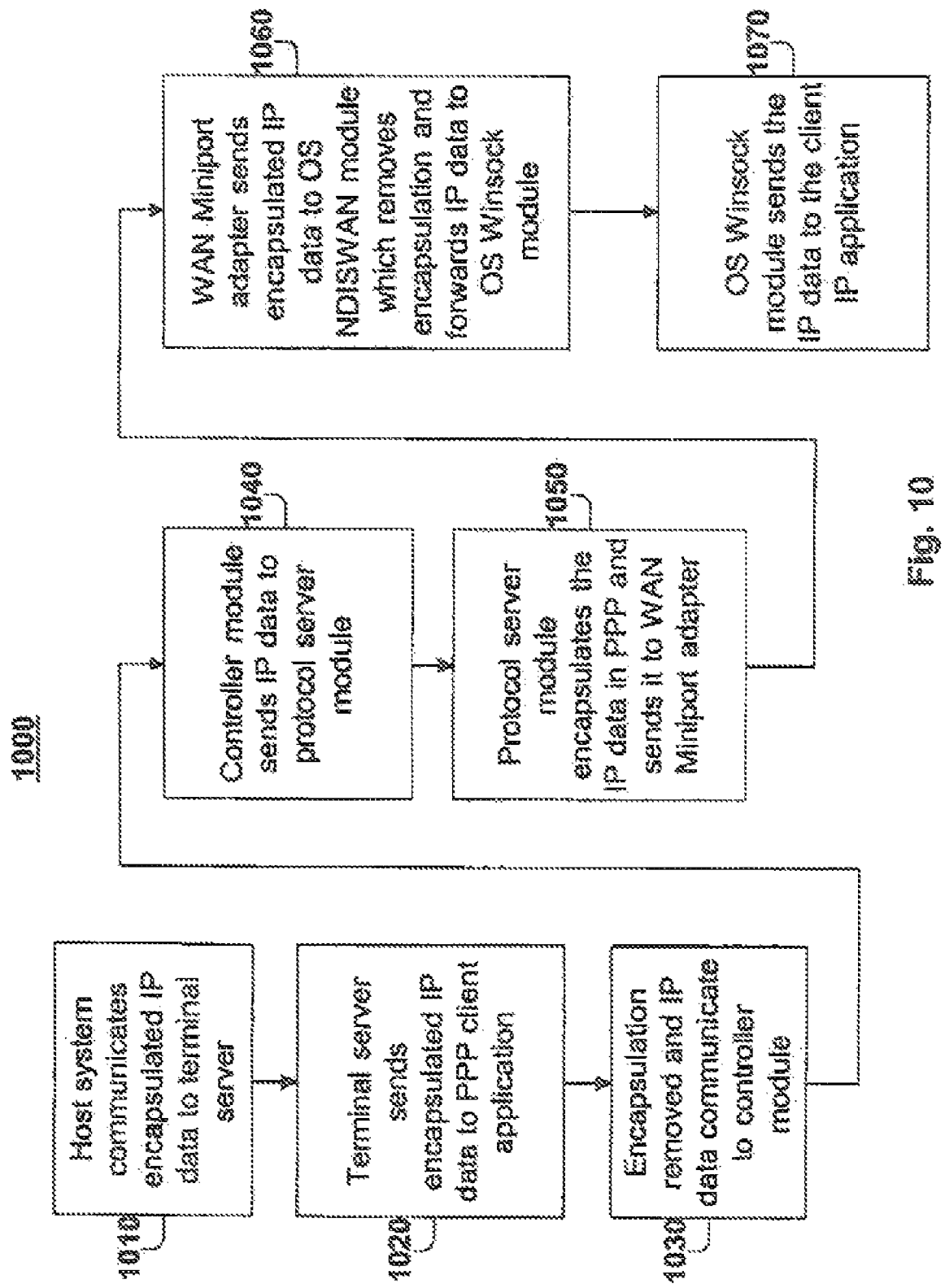
FIG. 10 is a flow chart of a process of an example implementation of the process of FIG. 8.

Referring to FIG. 10, process 1000 illustrates one example implementation of IP data sent by the host system to the client system. The host system communicates the encapsulated IP data to the terminal server (step 1010), which sends the encapsulated IP data to the PPP client application (step 1020). The PPP client application removes the PPP encapsulation from the IP data and communicates the IP data to the controller module (step 1030). The controlled module sends the IP data to the protocol server module (step 1040). The protocol server module encapsulates the IP data in PPP and sends it to the WAN Miniport adapter (step 1050). The WAN Miniport adapter forwards the encapsulated IP data to the NDISWAN, which removes the encapsulations and forwards the IP data to Winsock (step 1060). Winsock sends the IP data to the client IP application (step 1070).

Referring to FIG. 11, process 1100 illustrates one implementation for communicating data packets between a client device and a host system through a network. Process 1100 typically includes, at the client device, terminating a communication session that uses a first protocol and that is intended to enable communications between a source and a destination, in which the source is one of a client device operating system protocol stack and the host system and the destination is one of the client device operating system protocol stack and the host system but that differs from the source (step 1110), translating the data packets from the source between the first protocol and a second protocol that differs from the first protocol (step 1120), and transporting the data packets having the second protocol to the destination through the network (step 1130). Process 1100 includes communicating data packets (e.g., layer three data packets) from the OS protocol stack to the host system and from the host system to the OS protocol stack. Terminating the communication session (step 1110), translating the data packets (step 1120), and transporting the data packets (step 1130) may be performed using a protocol server module.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application specific integrated circuits).

It will be understood that various modifications may be made without departing from the spirit and scope of the claims. For example, advantageous results still could be achieved if steps of the disclosed techniques were performed in a different order and/or if components in the disclosed system were combined in a different manner and/or replaced or supplemented by other components. Accordingly, other implementations are within the scope of the following claims.

What is claimed is:

1. A system located on a client device for communicating data packets between the client device and a host system, the system comprising:
   a protocol server module structured and arranged to:
      terminate a communication session that uses a first protocol and that is intended to enable communications between a source and a destination, wherein the source is one of the client device operating system protocol stack and the host system and the destination is one of the client device operating system protocol stack and the host system but differs from the source,
      translate data packets from the source between the first protocol and a second protocol that differs from the first protocol,
      receive configuration data from an entity other than the client device, and transport the data packets having the second protocol to the destination using the configuration data received from the entity other than the client device; and
   a controller module that is logically connected to the protocol server module and that is structured and arranged to control communications between the client device operating system protocol stack, the protocol server module, and the host system.

2. The system of claim 1 wherein the client device operating system protocol stack supports PPP.

3. The system of claim 1 wherein the protocol server module includes a PPP server module located on the client device.

4. The system of claim 3 wherein the PPP server module is structured and arranged to terminate a PPP communication session between the client device operating system protocol stack and the host system.

5. The system of claim 3 wherein the PPP server module is structured and arranged to negotiate a PPP communication session with the client device operating system protocol stack.

6. The system of claim 1 wherein the protocol server module and the controller module perform transparent to a sender of the data packets.

7. The system of claim 1 wherein the protocol server module is structured and arranged to enable collection of data for error checking.

8. The system of claim 1 wherein the protocol server module is structured and arranged to filter the data packets prior to transporting the data packets to the destination.

9. The system of claim 1 further comprising a virtual modem adapter logically connected between the client device operating system protocol stack and the protocol server module.

10. The system of claim 1 wherein the data packets include layer three data packets.

11. A system located on a client device for communicating data packets between the client device and a host system, the system comprising:
   a protocol server module structured and arranged to:
      terminate a communication session that is intended to enable communications between a source and a destination, wherein the source is one of the client device operating system protocol stack and the host system and the destination is one of the client device operating system protocol stack and the host system but differs from the source,
      remove encapsulation from data packets arriving from the source,
      receive configuration data from an entity other than the client device, and
      encapsulate data packets using the configuration data received from the entity other than the client device; and
   a controller module that is logically connected to the protocol server module and that is structured and arranged to control communications between the client device operating system protocol stack, the protocol server module, and the host system.

12. The system of claim 11, wherein encapsulating data packets further comprises changing the source or the destination network addresses of the data packets.

13. The system of claim 11, wherein encapsulating data packets further comprises translating data packets between a first protocol and a second protocol.

14. A method for communicating data packets between a client device configured with at least one processor and a host system, the method comprising:
   using the at least one processor to terminate, at a protocol server module located at the client device, a communication session that uses a first protocol and that is intended to enable communications between a source and a destination, wherein the source is one of the client device operating system protocol stack and the host system and the destination is one of the client device operating system protocol stack and the host system, but differs from the source;
   translating data packets from the source between the first protocol and a second protocol that differs from the first protocol;
   receiving configuration data from an entity other than the client device;
   transporting the data packets having the second protocol to the destination using the configuration data received from the entity other than the client device; and
   controlling communications between the client device operating system protocol stack, the protocol server module, and the host system using a controller module.

15. The method of claim 14 wherein the client device operating system protocol stack supports PPP.

16. The method of claim 14 wherein the protocol server module includes a PPP server module located on the client device.

17. The method of claim 15 further comprising terminating a PPP communication session between the client device operating system protocol stack and the host system.

18. The method of claim 15 further comprising negotiating a PPP communication session with the client device operating system protocol stack.

19. The method of claim 14 wherein the protocol server module and the controller module perform transparent to a sender of the data packets.

20. The method of claim 14 further including collecting of data for error checking.

21. The method of claim 14 further including filtering the data packets prior to transporting the data packets to the destination.

22. The method of claim 14 further comprising using a virtual modem adapter logically connected between the client device operating system protocol stack and the protocol server module.

23. The method of claim 14 wherein the data packets include layer three data packets.

24. A method for communicating data packets between a client device configured with at least one processor and a host system, the method comprising:

using the at least one processor to terminate, at a protocol server module located at the client device, a communication session that is intended to enable communications between a source and a destination, wherein the source is one of the client device operating system protocol stack and the host system and the destination is one of the client device operating system protocol stack and the host system but differs from the source;

removing encapsulation from data packets arriving from the source;

receiving configuration data from an entity other than the client device;

encapsulating data packets using the configuration data received from the entity other than the client device; and controlling communications between the client device operating system protocol stack, the protocol server module, and the host system using a controller module.

25. The method of claim 24, wherein encapsulating data packets further comprises changing the source or the destination network addresses of the data packets.

26. The method of claim 24, wherein encapsulating data packets further comprises translating data packets between a first protocol and a second protocol.

27. A non-transitory computer-usable storage medium storing a computer program used for communicating data packets between a client device and a host system, the computer program comprising instructions for causing the client device to perform the following operations:

terminate, at a protocol server module located at the client device, a communication session that uses a first protocol and that is intended to enable communications between a source and a destination, wherein the source is one of the client device operating system protocol stack and the host system and the destination is one of the client device operating system protocol stack and the host system but differs from the source;

translate data packets from the source between the first protocol and a second protocol that differs from the first protocol;

receive configuration data from an entity other than the client device;

transport the data packets having the second protocol to the destination using the configuration data received from the entity other than the client device; and control communications between the client device operating system protocol stack, the protocol server module, and the host system using a controller module.

28. A non-transitory computer-usable storage medium storing a computer program used for communicating data packets between a client device and a host system, the computer program comprising instructions for causing the client device to perform the following operations:

terminate, at a protocol server module located at the client device, a communication session that is intended to enable communications between a source and a destination, wherein the source is one of the client device operating system protocol stack and the host system and the destination is one of the client device operating system protocol stack and the host system but differs from the source;

remove encapsulation from data packets arriving from the source;

receive configuration data from an entity other than the client device;

encapsulating data packets using the configuration data received from the entity other than the client device; and control communications between the client device operating system protocol stack, the protocol server module, and the host system using a controller module.

\* \* \* \* \*